United States Patent [19]

Bell

[11] Patent Number: 4,670,733

[45] Date of Patent: Jun. 2, 1987

[54] DIFFERENTIAL PRESSURE TRANSDUCER

[75] Inventor: Robert L. Bell, Agoura Hills, Calif.

[73] Assignee: Bell Microsensors, Inc., Newbury Park, Calif.

[21] Appl. No.: 750,769

[22] Filed: Jul. 1, 1985

[51] Int. Cl.⁴ .......................................... H01L 10/10
[52] U.S. Cl. ........................................ 338/36; 338/42
[58] Field of Search .................. 338/36, 38, 42, 5; 73/324, 717, 718, 719, 723, 724, 721; 361/277, 280, 283

[56] References Cited

U.S. PATENT DOCUMENTS

| | | | |
|---|---|---|---|
| 4,080,830 | 3/1978 | Eckstein et al. | 73/719 |
| 4,158,311 | 6/1979 | Yasuhara et al. | 73/724 X |
| 4,388,833 | 6/1983 | Kuwayama | 73/718 |
| 4,458,537 | 7/1984 | Bell et al. | 73/718 |
| 4,527,428 | 7/1985 | Shimada et al. | 73/721 |
| 4,572,000 | 2/1986 | Kooiman | 73/718 |
| 4,578,735 | 3/1986 | Knecht et al. | 361/283 |

Primary Examiner—E. A. Goldberg
Assistant Examiner—M. M. Lateef
Attorney, Agent, or Firm—Bogucki, Scherlacher, Mok & Roth

[57] ABSTRACT

In a differential pressure transducer having isolation diaphragms on opposite sides of a sensing diaphragm, the isolation diaphragms are made highly compliant, are radially prestressed and are bowed outwardly relative to closely spaced backup surfaces by oil pressure. Using very small interior cavities and a substantially stiffer sensing diaphragm differential process pressures induce linear deflection of the sensing diaphragm.

24 Claims, 14 Drawing Figures

INITIALLY CRIMPED EDGE

DIFFERENTIAL PRESSURE TRANSDUCER

BACKGROUND OF THE INVENTION

This invention relates to pressure transducers, and more particularly to differential pressure transducers of the capacitive type that utilize isolation diaphragms.

Capacitive pressure transducers of the present state of the art utilize a sensing diaphragm having at least one electrode on its surface, together with another electrode structure in facing relationship to the electrodes on the sensing diaphragm. As pressure variations flex the sensing diaphragm, the distance between the diaphragm electrode and the opposite electrode changes, providing a capacitance variation which is a measure of the pressure variation that caused the deflection. In a differential pressure transducer, the pressures act on opposite sides of the diaphragm and the deflection is representative of the difference between the the pressures. However, although the differences may be small the absolute line pressures may be large, so that even a very brief exposure to one pressure without the other can result in shattering or excessive deformation of the sensitive diaphragm. For this and other reasons, differential pressure transducers are manufactured in configurations in which there is a backup surface adjacent one or both faces of the diaphragm, so as to limit its excursion by causing it to bottom out within its elastic limits. Alternatively or additionally, isolation diaphrams are interposed to communicate pressures to the opposite sides of the sensing diaphragm. Input pressures exerted by fluid on each side do not act directly on the sensing diaphragm, but act against the outsides of the two isolation diaphragms. The isolation diaphragms then seek to deflect against a liquid that fills the interior space between the isolation diaphragms and the sensing diaphragm, thus communicating the pressures to the sensing diaphragm.

The present state of the art of differential pressure transducers has reached a high level of precision and capability, but users are demanding even more in terms of cost and performance. A number of conflicting requirements must be met in attaining higher levels of effectiveness. For a differential pressure transducer to be highly sensitive, the sensing diaphragm must be precisely deflectable with very small variations, with high repeatability and very low hysteresis. The space between the electrode on the sensing diaphragm and the opposed electrode of the capacitor pair is often very small, so that minute deflections must be accurately measured. The sensing diaphragm and the structure must nonetheless be sufficiently rugged to withstand vibrations and shocks encountered in industrial usage. However, many factors operate to diminish accuracy, linearity and the operative integrity of the unit in general. For example, even though a differential pressure transducer using isolation diaphragms is completely filled with a pressure transducing fluid, the fluid is not truly incompressible, and its dielectric constant changes with the pressure exerted upon it. Similarly, temperature variations cause changes in the dielectric constant, and such changes alter the capacitance reading. The isolation diaphragm is deflectable, but if deflected over a substantial distance its characteristic is not linear, and this also affects the accuracy of the reading, especially if the isolation diaphragm is relatively stiff, or in the range of 10%-30% of the sensing diaphragm stiffness.

Moreover, in the prior art constructions the isolation diaphragms have been fabricated to special curvatures and convolutions, with concentric waves shaped in accordance with complex calculations. Such curvatures are employed because pressure variations with current designs are otherwise transmitted non-linearly to the sensing diaphragm. These requirements greatly increase their cost and decrease production yields. A need therefore exists for improved differential pressure transducers of the type that employ isolation diaphragms. This need exists whether deflection is sensed by capacitive, inductive or other means.

Prior patents of the present inventor may be referred to as evidencing the state of the art relative to capacitive pressure transducers using ceramic sensing diaphragms (U.S. Pat. No. 4,295,376) and differential pressure transducers having a grounding structure for preventing excessive deflection of a sensing diaphragm (U.S. Pat. No. 4,458,537).

One current approach toward overcoming these problems is to use a "floating cell" configuration that transfers oil in parallel with the movement of the sensing diaphragm. Such structures, however, are expensive and difficult to manufacture, and so complex that they introduce additional performance problems.

SUMMARY OF THE INVENTION

Differential pressure transducers in accordance with the invention utilize a sensing diaphragm in the mid region of a support structure having rigid reference plates on opposite sides of the diaphragm, spaced apart by a small distance, such as 0.001" from the reference plates on each side, to define a first deflection volume. Initially flat isolation diaphragms are radially stretched across the opposite faces of the reference plates, and separated by a comparable spacing, typically 0.001" or less, thus defining a second deflection volume. A centrally disposed small conduit through the reference plates in a direction perpendicular to the plane of the sensing diaphragm communicates between the two changeable deflection volumes. The total, very small cavity (e.g., of the order of 0.001 cubic inch) thus enclosed is filled with oil under pressure, and the pressures on the two sides are substantially equalized. The isolation diaphragms have compliances more than an order of magnitude greater than the sensing diaphragm and the isolation diaphragms are deflected outwardly to a controlled extent during the fill process. Pressures acting on the outside surface of the isolation diaphragms are communicated into and against the sensing diaphragm, and the initial deflection of the sensing diaphragm can be set in accordance with process conditions to cover a predetermined range of differential pressures. Under these conditions the sensing diaphragm operates essentially linearly in response to applied differential pressures. Further, at maximum deflection, the isolation diaphragm merely bottoms out against the underlying flat surface of the reference plate so that a complexly curved isolation diaphragm is not needed. The very small oil transmission volume in the deflection volumes assures faithful and precise transmission of pressure variations to the sensing diaphragm. Further, the unit introduces minimal variations due to temperature, because of the low oil volumes used. The flat isolation diaphragms and sensing diaphragm, together with the flat-faced reference plates, may be fabricated precisely with low cost, while maintaining excellent linearity across a wide pressure range.

The isolation diaphragms are advantageously prestressed with radial tension so as to assure initial flatness. In one example this is achieved by curvature of the outer rim of the diaphragm down about a circular bead, and clamping of the outer rim so as to provide a drum head effect. In another example the midregion of the isolation diaphragm is made taut by an encircling tongue and groove configuration.

Apertures leading into the second deflection volume from the side of the assembly are arranged to enable an oil filling and sealing operation to be carried out exterior to the transducer but without introducing added quantitites of pressure transmitting fluid. The apertures may be sealed by inserting small balls which are frictionally or otherwise retained in position.

The electrode patterns may be deposited by thin film techniques, insuring repeatability and adequately precise definition. The patterns are configured to extend to externally accessible terminal pads. In addition, the patterns may include other elements, such as temperature sensitive resistors, which can be employed in signal processing to attain greater accuracy.

In accordance with other features of the invention, the deflection of the diaphragm is sensed by an electrode arrangement employing reference capacitor pairs outside the principal deflection region of the sensing diaphragm. With these capacitors arranged in parallel, a signal is provided which is sensitive to static pressure but relatively insensitive to differential pressure. The signal is used to compensate for minor variations in output due to static pressure variations, thereby enhancing the accuracy of capacitance readings.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
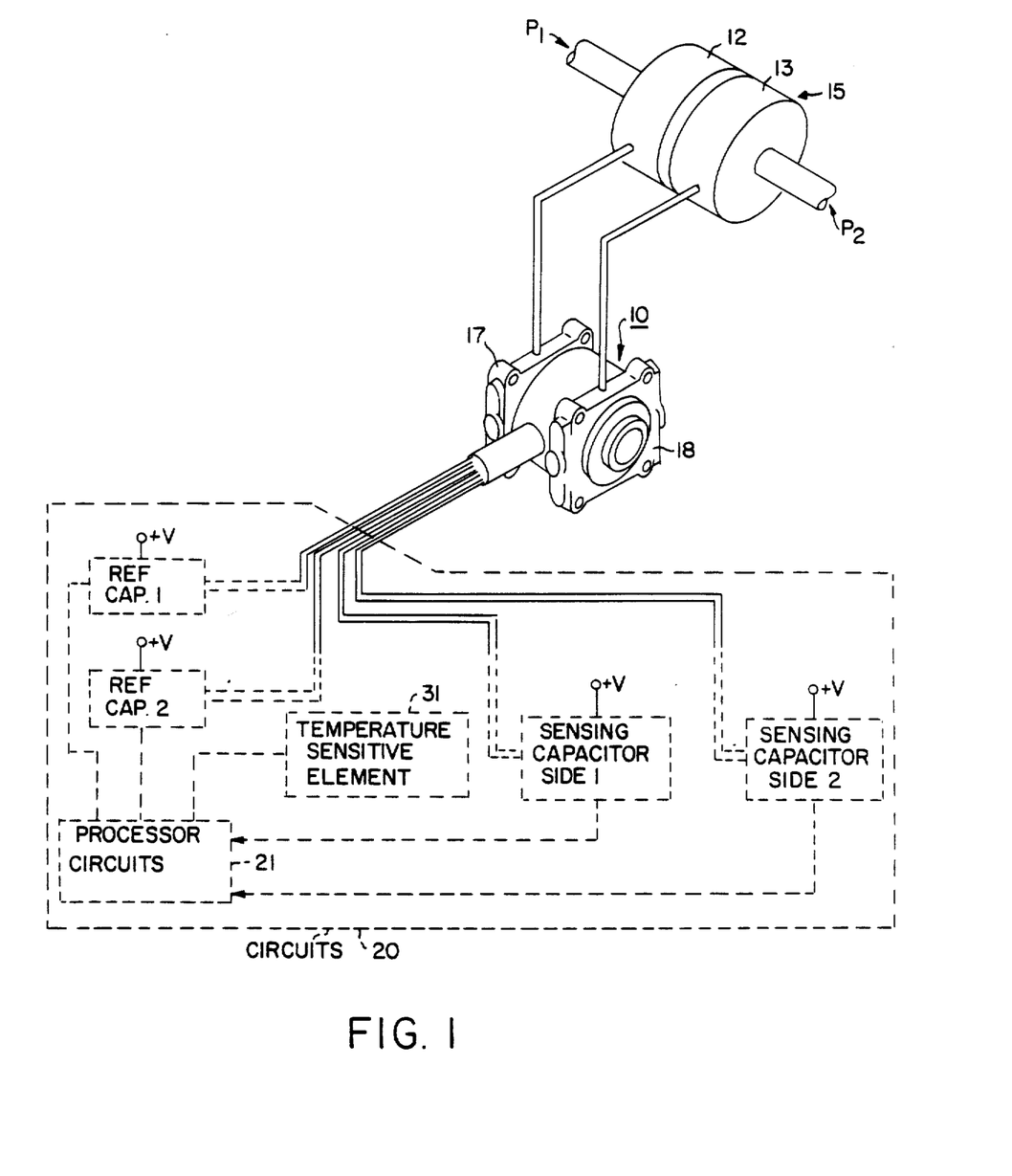
FIG. 1 is a combined perspective and block diagram view of a pressure transducer system in accordance with the invention.
Figure 2:
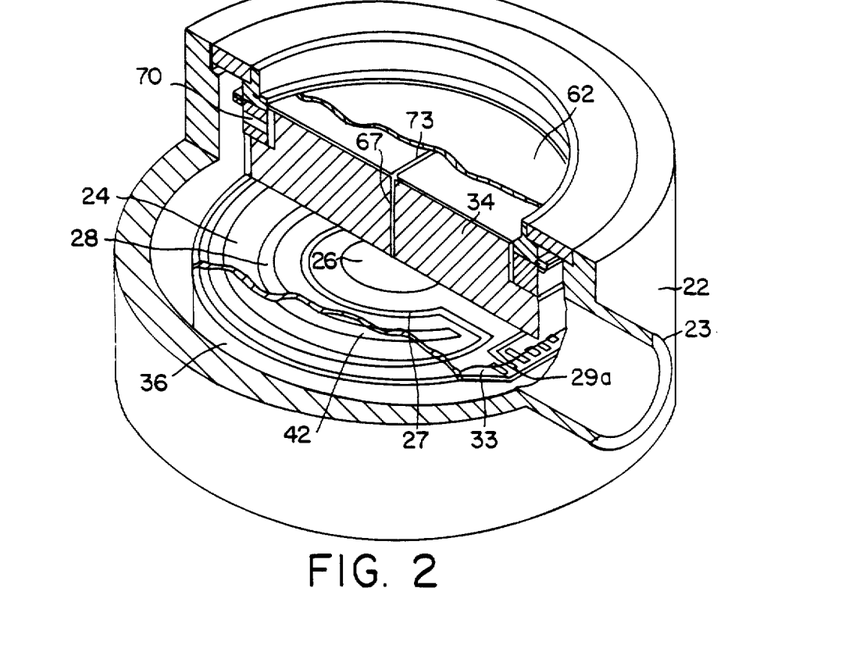
FIG. 2 is a perspective view, partially broken away, of the central portion of a differential pressure transducer in accordance with the invention.

A differential pressure transducer 10 in accordance with the invention, referring now to FIG. 1, is shown for use in a given range of differential pressures, say 0–30 psi in this example, with an absolute common mode pressure level that can be much higher (e.g. 500–5000 psi). Pressures are derived from different junctions 12, 13 in a piping or process system 15, by lines that may contain valving (not shown for simplicity) and that are coupled to opposite sides of the transducer 10 by process joints 17, 18 of conventional design. Voltages are applied to the transducer 10 and signal variations are derived therefrom via electrical circuits 20 which include processor circuits 21 that include analog to digital converter capability (not shown). Such processing circuits are now utilized in transducer technology for effecting final precise linearization of the signal variations and providing digital values at times and in forms required by an associated system.

Figure 8:
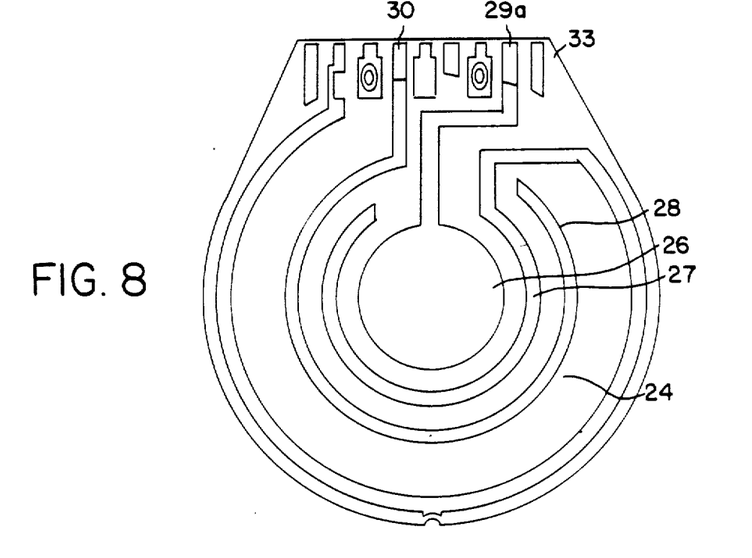
FIG. 8 is a plan view of a sensing diaphragm structure in accordance with the invention, as viewed from a first side.
Figure 9:
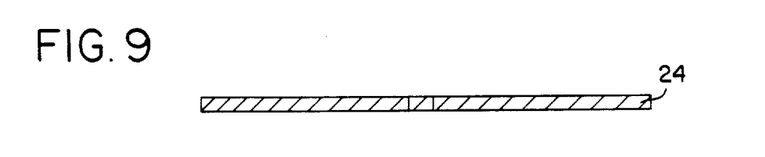
FIG. 9 is a side view of the diaphragm of FIG. 8.
Figure 10:
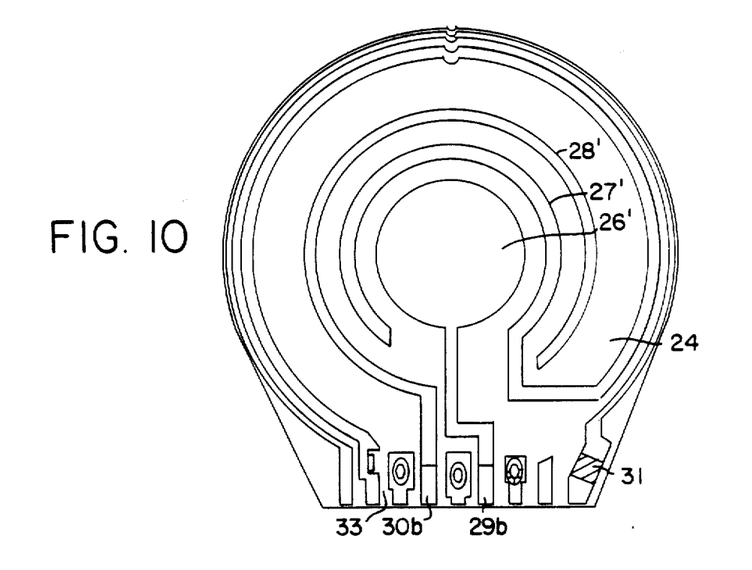
FIG. 10 is a plan view from the second side of the sensing diaphragm of FIG. 8.

The principal units of the transducers 10, as best seen in FIGS. 2–5, are contained within a cylindrical housing 22 concentric with a central axis except for a side T connection tube 23 through which circuit connections are made. A ceramic sensing diaphragm 24 is positioned in a central plane perpendicular to the central axis, within the housing 22. As seen best in FIGS. 8 and 10, to which reference is briefly made, the sensing diaphragm 24 has substantially identical electrode patterns on its opposite broad faces, these patterns each comprising a center disk 26 and an outer annulus 28, both concentric about a central axis perpendicular to the plane of the diaphragm 24, and separated by a grounding electrode 27 which minimizes interaction between them. Electrical couplings are made between these electrodes 26, 28 and the associated circuits 20 via peripheral conductive pads 29, 30. The elements in the like arrangement on the opposite side of the sensing diaphragm 24 are distinguished by using primed numbers, e.g. 26' and 28', and will not be repetitively described. The pads 29, 30, together with a temperature sensitive resistor 31, are on an extending tab 33 on one side of the sensing diaphragm 24 that provides access for external connection within the housing 22. The central electrode 26 encompasses the maximum deflection central region of the diaphragm 24, while the outer electrode 28 is close to the confined periphery of the diaphragm 24 and therefore has only minor deflections that are nonetheless for specific purposes as described below.

Figure 11:
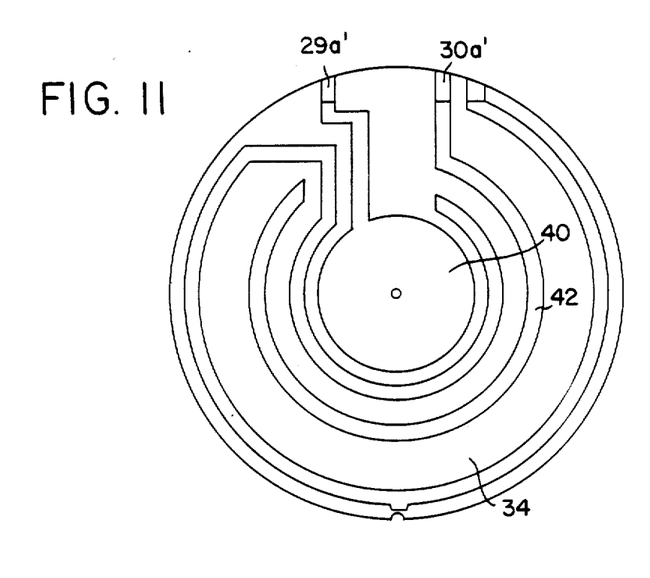
FIG. 11 is a plan view of the electrode pattern on a first reference plate.
Figure 12:
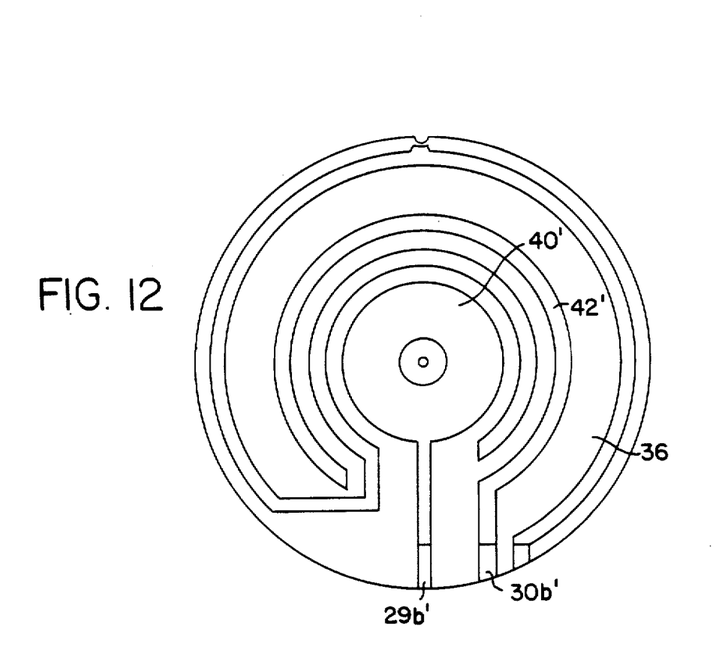
FIG. 12 is a plan view of the electrode pattern on a second reference plate.

Referring to FIGS. 2–5, a pair of ceramic reference plates 34, 36 are disposed above and below, respectively, the sensing diaphragm 24. As seen in FIGS. 11 and 12, each reference plate 34, 36 has inner disk and outer annulus electrodes 40, 42, respectively, disposed in facing and coextensive relation to the like electrodes 26, 28 on the sensing diaphragm 24. The opposed sensing electrodes 26, 40 on the reference plate 34 on one side of the diaphragm 24 are matched by another pair 26', 40' on the plate 36 on the opposite side, to form two sensing capacitor pairs which vary in push-pull fashion as the diaphragm 24 deflects.

Four conductive pads, all designated 29, are available on the extending tab 33 and coupled to these two sensing capacitors to make electrical connections externally. Two pads, designated as 29a and 29b, comprise the signal leads, and the other two 29a' and 29b' provide voltage from a source (not shown). When the reference plates 34, 36 are assembled on opposite sides of the sensing diaphragm 24, an inter-layer connection is made between opposed conductive patterns on the reference plate and sensing diaphragm, so that external wires need be soldered only to the pads on the tab 33 extending from the diaphragm 24. In like fashion, two reference capacitors are defined on opposite sides by the outer electrode pairs 28, 42 and 28', 42', with four conductive pads 30a, 30b and 30a', 30b' providing access external to the housing 22.

Figure 3:
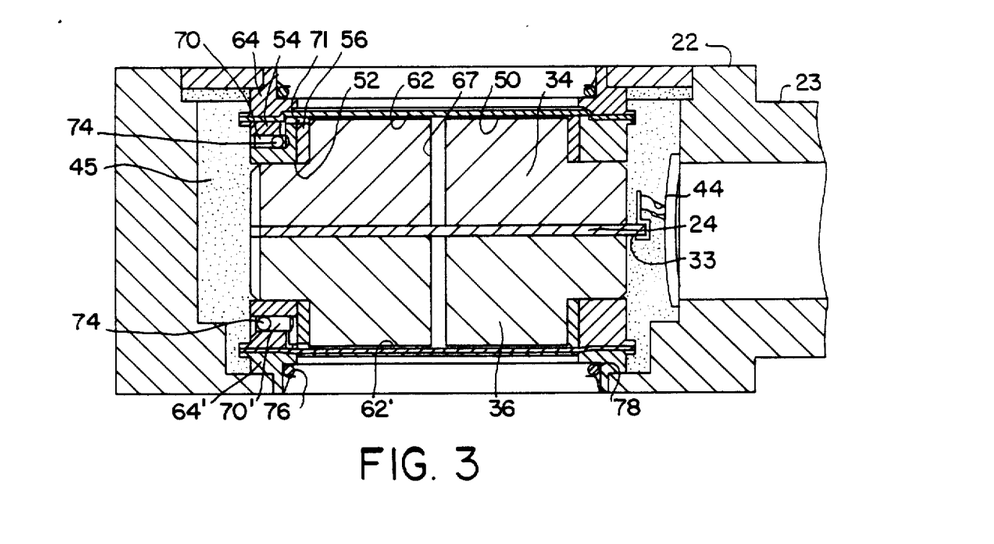
FIG. 3 is a cross-sectional view of the central portion of the transducer of FIG. 1.
Figure 6:
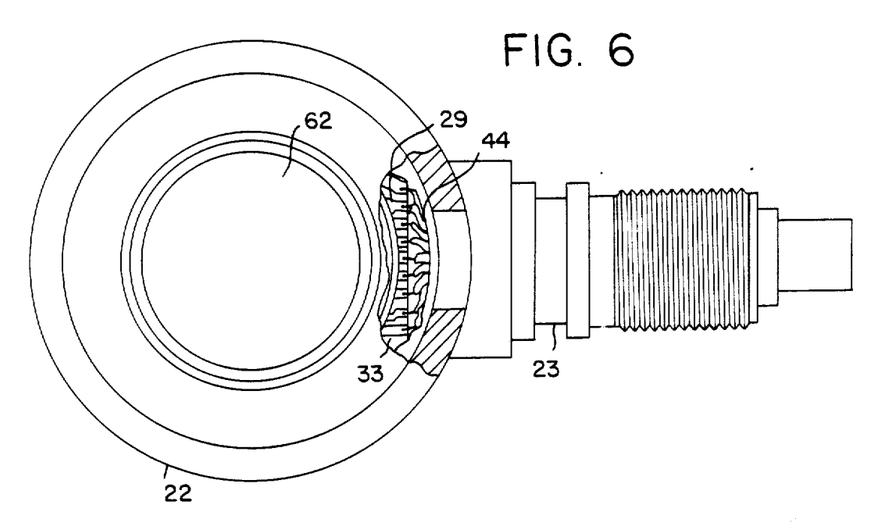
FIG. 6 is a plan view, partially broken away, of a pressure transducer device with associated housing.
Figure 7:
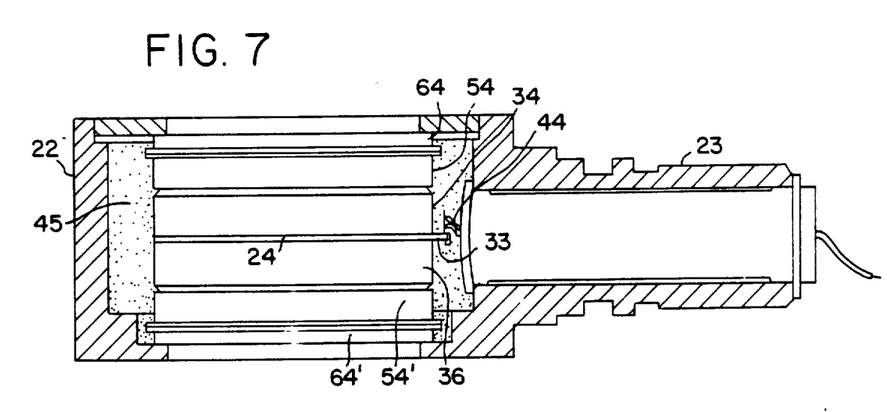
FIG. 7 is a side sectional view of the housing for the device of FIG. 6, incorporating the central portion of the transducer in side view.

As seen in FIGS. 3, 6, and 7, leads 44 to and from the various pads 29, 30 provide couplings through the T connection 23 to the circuits 20, while certain of these leads provide couplings to and from the temperature sensitive resistor 31. The central assembly of the transducer 10, including the sensing diaphragm 24 and reference plates 34, 36, is isolated and protected within the housing by potting compound 45, as best shown in FIGS. 3 and 7.

Figure 4:
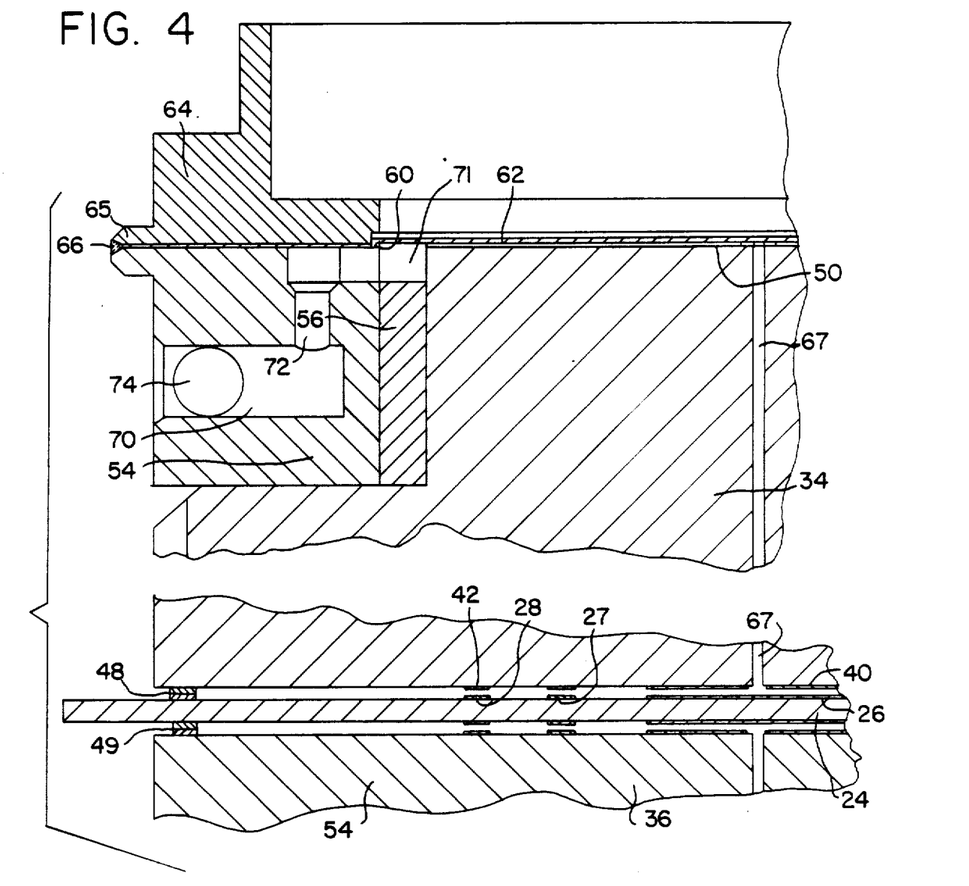
FIG. 4 is an enlarged fragmentary sectional view of portions of the isolation and sensing diaphragm structure utilized in the transducer of FIGS. 2 and 3.
Figure 5:
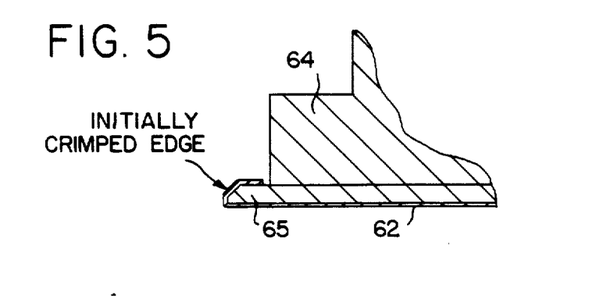
FIG. 5 is an enlarged fragmentary sectional view of a portion of the structure of FIG. 4, showing an intermediate stage in assembly.

Referring again to FIGS. 2-5, the reference plates 34, 36 are much thicker than the sensing diaphragm 24, which in this example is 0.033", so that there is no measurable bending of the plates 34, 36 under the existing pressures. The spacings between the sensing diaphragm 24 and the opposed flat faces of the reference plates 34, 36 are small (e.g. 0.001"), being established by annular spacers 48, 49 (not apparent except in FIG. 4, which is not to scale) around the peripheries of the plates 34, 36. The spacers 48, 49 are glass bonding layers that are here about one mil in height, and define both a low volume cavity and a small gap between the facing pairs of electrodes, which are here thin film deposited layers of gold, silver or other conductive material. Though the gap is only about one (1) mil, this is more than enough to allow for maximum deflection of the sensing diaphragm 24 without contact between opposed electrode pairs 26, 40 and 28, 42. The glass bonding spacers 48, 49 may be deposited originally as a frit and the assembly of two reference plates 34, 36 separated by the interior diaphragm 24, is held in a fixture as the temperature is raised to vitrification level to bond the elements together and establish a hermetic seal. The view of FIG. 4 is specifically not to scale in other respects as well, inasmuch as the width of the gap and thickness of the thin film electrodes, e.g. 26, 40, have been exaggerated. The gap between opposed electrodes, therefore, is only slightly less than the spacing between the diaphragm 24 and a reference plate 34 or 36. The thin film electrodes and the temperature sensitive resistor may be deposited by silk screen techniques, so as to assure precise patterns and repeatability in production volumes.

The reference plates 34, 36 and associated elements are substantially alike in remaining details so only one will be described with particularity and the description will be understood to apply to both. On the side of reference plate 34 (as best seen in FIGS. 3 and 4) away from the diaphragm 24 there is a flat backing face 50, parallel to the central plane, within an inset shoulder 52 that extends concentrically around the central axis and provides a peripheral sealing region for receiving a stainless steel seal ring 54 whose inner diameter is slightly greater than the outer diameter of the reference plate 34 at the inset shoulder 52. The space between is filled by a glass seal ring 56 joining the elements 34, 54 together. The edge of the stainless steel seal ring 54 adjacent the backing face 50 has a raised circular bead 60 (best seen in FIG. 4) about ten (10) mils higher than the plane of the rest of the surface of the steel seal ring 54. The glass seal ring 56 is of like height. A tensioned isolation diaphragm 62 is stretched across the backing face 50 across the circular bead 60 and glass seal ring 56. The tensioning, which is in the outward direction relative to the backing face 50, is impelled by registration of a stainless steel weld ring 64 onto the seal ring 54 outside the bead 60. Also, the weld ring 64 has a peripheral lip 65 about which the outer periphery of the isolation diaphragm 62 is clamped, as shown only in FIG. 5. Thus the edge restraint of the peripheral lip enables the outer periphery of the isolation diaphragm 62, in its deflection region, to be clamped down by the weld ring 64 and to induce uniform outward tensioning forces in it in the manner of a tensioned drum head. The stainless steel rings 54, 64 are joined together, and to the sandwiched isolation diaphragm 62, by an outer weld 66 around the outer circumference which removes the crimped edge of the isolation diaphragm, as shown in FIG. 4.

In the reference plate 34, a central axial aperture 67 provides a conduit between the small volume defined by the gap between the sensing diaphragm 34, and the small volume between the backing face 50 and the isolation diaphragm 62, which together define an enclosed cavity. However, the isolation diaphragm 62 is subsequently bowed outwardly when filling the enclosed interior space between the two deflectable diaphragms 24, 62 with an essentially inert oil of one of the commercial types widely used. to this end at least one tapered radial aperture 70 in the stainless steel seal ring 54 leads through the housing 22 into the region between the isolation diaphragm 62 and the backing face 50. In this region a radial opening 71 in the stainless steel and glass seal rings 54, 56 respectively communicates with the inner part of the radial aperture 70 via a perpendicular bore 72, so that externally supplied oil passes into the interior cavity. To aid filling, a hard vacuum is first drawn in the cavity, and oil is then fed into the radial housing aperture 70. Filling is aided by crossed 0.005" lateral grooves 73 in the reference plate 62 surface (FIG. 2), along with a smaller and partially nesting depression in the isolation diaphragm 62. When the interior cavity is filled with oil, sufficient pressure is applied to bow out the isolation diaphragm 62 by approximately 0.001", and a small ball 74 (FIGS. 3 and 4) is then inserted to frictionally engage within and close off the tapered aperture 70. The ball 74 may be frictionally, elastically or otherwise engaged within the aperture 70, and may include an attached pin (not shown) for easier removal. The pressurized internal chamber may also be closed off by other known expedients, such as a plug, solder seal or one-way valve (not shown), but the ball press technique is preferred because the volume can be kept very low. The total volume of oil in the interior chamber is very low, of the order of 0.001 in$^3$. In the practical example being discussed it is approximately 0.0025 in$^3$ and in any event is held below 0.010 in$^3$. This volume is orders of magnitude smaller than oil-filled volumes in prior art pressure tranducers. Some known commercial devices, for example, of the type having specially curved bottoming surfaces under a formed and convoluted isolation diaphragm, use an approximately 0.2 in³ volume.

The compliance of the isolation diaphragm 62 is much greater (here more than 100 times) that of the sensing diaphragm 24. To establish this relationship, the isolation diaphragm 62 is a 0.0025" thick sheet of stainless steel, such as 316 alloy, Hastelloy-C or Monel metal, wherein the ceramic sensing diaphragm 24 is a molded and finished ceramic of 0.033" thickness.

The upper and lower weld rings 64, 64' fit within and define side openings in the transducer housing 22, to couple to the exterior process flanges 17, 18 (FIG. 1 only) and thus provide interior communication between the different fluid pressure sources and the different isolation diaphragms 62, 62' in the two halves. An O-ring 65 set into an internal shoulder 78 in the weld ring 64 seals the pressure connection in this region. The T connection 23 into the interior of the housing 22 provides access for the circuit connections to the internal electrodes. The potting compound 45 filling the interior of the housing 22 about the reference plates 34, 36 and weld rings 64, 64' prevents entry of moisture and provides structural rigidity.

Prior to the operation of the differential pressure transducer of FIGS. 2-5, the isolation diaphragms 62, 62' have been radially prestressed by the peripheral clamping at the weld ring 64, and by the internal oil pressurization that deflects the diaphragms outwardly. The internal pressures may be balanced on each side during this operation by sensing signal variations at the sensing capacitor formed by the internal electrodes 26, 40. Thereafter, pressure variations in the two lines being sensed are communicated through the isolation diaphragms 62, 62' into the pressurized interior cavities, and consequently against the opposite sides of the sensing diaphragm 24. The net deflection of the sensing diaphragm as established by the opposite variations in capacitive value of the two inner capacitive pairs is the primary measure of the differential pressure reading. As discussed more specifically below, however, the accuracy of the device is affected by certain nonlinearities which are taken into account by transducers in accordance with the present invention. A material initial advantage in the configuration, however, derives from the fact that the backing faces 50, 50' are flat and the isolation diaphragms 62, 62' initially bowed. It has heretofore been thought that a convoluted isolation diaphragm must deflect, for good linear operation, over distances more than 0.002". Full deflection, when bottoming out to protect the sensing diaphragm against an excessive pressure surge, therefore has required that the backing surface follow a complex convoluted curvature and be adjacent the sensing diaphragm. In accordance with the present invention, the slightly bowed and readily deflectable isolation diaphragms 62, 62' merely straighten to engage flat surfaces at the limiting pressure. In the device here described the sensing diaphragm 24 can operate with a maximum deflection of 40% of the range of deflection of the isolation diaphragm 62 (up to 1.0 mil) and yet remain extremely linear. This means that the cost of fabrication of the unit is substantially lower because only flat surfaces need be provided. Further, the same configuration can be used for different pressure ranges by changing only the sensing diaphragm thickness.

Other not readily evident factors, however, are also involved in the operation of a differential pressure transducer of this type. The pressurizing oil is compressible to a meaningful degree, and also changes in dielectric constant in response to consequent changes in density. At 3000 psi, for example, there is a 1½% to 2% change in density and a 3% change in dielectric constant. The dielectric constant also changes with variations in temperature. While it is known to use separate sensor devices to provide a reference as to pressure level so that some compensation can be introduced, this is not adequately effective for temperature or static pressure variations and introduces substantial undesired costs. The present system, in using a relatively highly compliant isolation diaphragm 62 together with a stiffer sensing diaphragm 24 and a very low oil volume, minimizes such effects. Pressure variations in the lines are applied with virtually minimum unwanted mechanical or hydraulic impedance to the sensing diaphragm. Only a small amount of deflection need be used, keeping the elements within their linear deflection ranges. Furthermore, the reference capacitor pairs are utilized in a unique fashion to sense variations in dielectric constant due to static pressure changes so that the output can be compensated further. The two reference capacitors comprising outer electrode pairs 28, 42 and 28', 42' are subject to very little deflection under differential pressure variations because they are close to the sensing diaphragm 24 perimeter, which is fixed. By coupling these oppositely varying capacitors in parallel, as shown in FIG. 1, the variations in signal that are derived represent essentially the change in dielectric constant due to static pressure and temperature variations in the pressurized oil.

The temperature sensitive resistor 31 is formed by thick film techniques onto the extending tab 33 on the sensing diaphragm 24. In this location the resistor 31 is insensitive to differential and static pressure variations. It does, however, provide a precise temperature indication for the transducer 10. The signal from this resistor 31 is applied to the circuits 20 to compensate the outputs of the transducer 10 and make its reading even more reliable and stable.

Other advantages of this transducer include the fact that the isolation diaphragm is so compliant and deflects over so small a distance before bottoming out that it cannot as a practical matter become distorted by exceeding its elastic limit. In addition, the operating range of the transducer can be shifted either positively or negatively by adjustment of process pressures so as to provide a given initial deflection of the sensing diaphragm.

Figure 13:
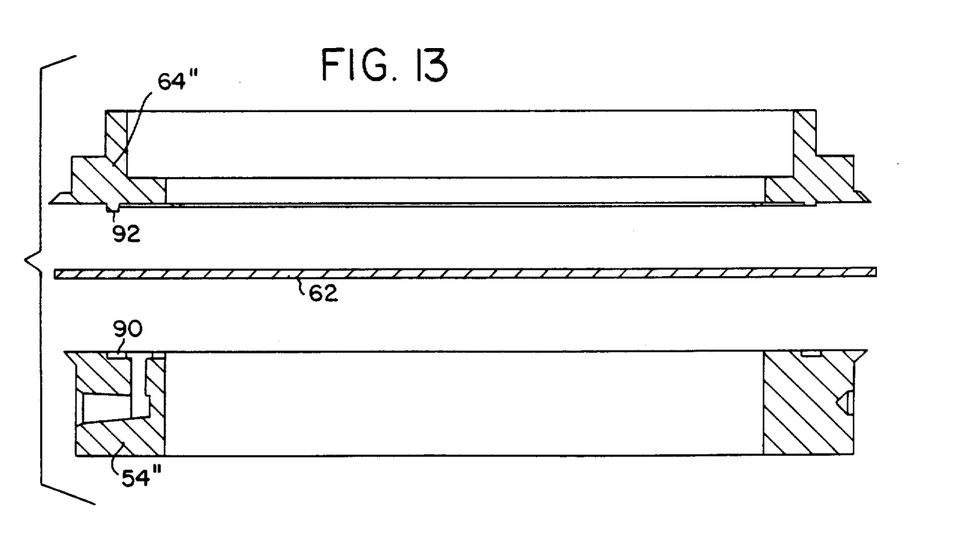
FIG. 13 is an exploded view of elements that may be employed in an alternative arrangement for tensioning the isolation diaphragms.
Figure 14:
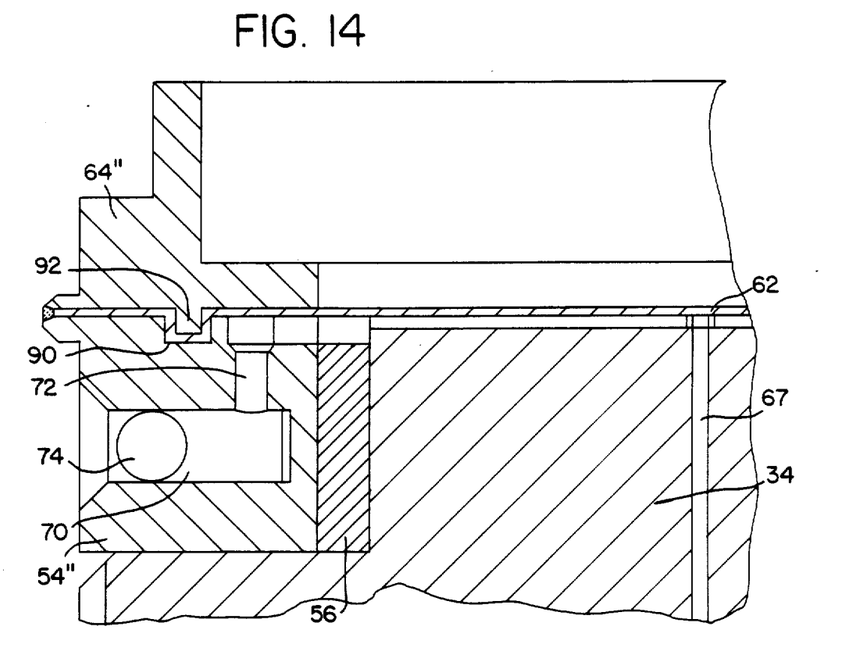
FIG. 14 is a side sectional view of the arrangement of FIG. 13.

A different arrangement for radially tensioning the isolation diaphragms, such as the diaphragm 62, is shown in FIGS. 13 and 14. Referring to those Figures, the stainless steel ring 54" and the inner glass seal ring 56" have flat surfaces lying in a given plane, except for a circular groove 90 in the ring 54" concentric about the central axis. The groove 90 is interior to the outer periphery of the stainless steel ring 54", and to the outer margin of the diaphragm 62. The stainless steel weld ring 64" includes a protruding ring or tongue 92 concentric with the central axis and mating within the groove 90 when the transducer is assembled, with allowance for the diaphragm 62 thickness.

As seen in FIG. 14, when the weld ring 64" is forced down toward the ring 54" against the interposed diaphragm 62, the tongue 92 distorts the diaphragm 62 into the groove 90. The portion of the diaphragm 62 encompassed by the tongue 92 is radially prestressed, assuring the flatness of the isolation diaphragm 62 before internal pressurizing begins. The flat surfaces on the rings 54", 64" that are disposed both radially inside and radially outside the tongue and groove aid in achieving planarity in the deflection region. To aid in prestressing the outer margin of the diaphragm may be crimped about the outer lip on one of the rings 54", 64" before they are forced together.

This arrangement not only aids in minimizing tendencies of the diaphragm 62 to have a very slight curvature, but also is somewhat easier to manufacture because the upper surface of the ring 54 can be ground flat in a unitary operation.

Although various alternatives and modifications have been described above and illustrated in the drawings, it will be appreciated that the invention is not limited thereto but encompasses all forms and variations falling within the scope of the appended claims.

What is claimed is:

1. A differential pressure transducer comprising:
   a pair of spaced apart ceramic reference plates having substantially parallel and opposing surfaces containing planar electrode means, the reference plates also including parallel planar outer surfaces and conduits extending therethrough between the electrode bearing surfaces and the outer surfaces;
   a ceramic diaphragm having electrode means on the opposite sides thereof and disposed symmetrically between the opposed surfaces of the reference plates, the diaphragm being substantially coextensive with and joined to the reference plates about their peripheries, the spacings between the reference plates and the diaphragm being of the order of 0.003" or less;
   a pair of relatively flat isolation diaphragms, each mounted adjacent the outer surface of a different reference plate and spaced apart therefrom to define a volume in communication with the conduit therein, the spacing between each diaphragm and reference plate outer surface being of the order of 0.003" or less; and
   means providing an oil fill in the interior volume of the reference plate including the gaps between the plate, the ceramic diaphragm and the isolation diaphragm, wherein pressure variations acting on the isolation diaphragms are transmitted to the ceramic diaphragm.

2. The invention as set forth in claim 1 above, wherein the isolation diaphragms comprise thin metal members and the transducer further comprises means for stretching the isolation diaphragms taut.

3. The invention as set forth in claim 1 above, wherein the means providing an oil fill curves the relatively flat isolation diaphragms outwardly within a linear deflection range, and wherein the isolation diaphragms are substantially more compliant than the ceramic diaphragm.

4. The invention as set forth in claim 3 above, wherein the system further includes means for providing pressurized input fluids to the opposite faces of the isolation diaphragms from the ceramic diaphragm, and wherein under overload pressure on one side the isolation diaphragm deflects on the higher overload pressure side and bottoms out against the adjacent planar surface before the ceramic diaphragm is fully deflected and overstressed.

5. The invention as set forth in claim 4 above, wherein the electrode means define at least one sensing capacitor and a pair of reference capacitors, and means for cumulatively adding the deviations of the reference capacitors.

6. The invention as set forth in claim 4 above, wherein the isolation diaphragms and ceramic diaphragm define enclosed oil-filled volumes on opposite sides of the ceramic diaphragm and wherein said oil-filled volumes are of the order of 0.001 in$^3$.

7. The invention as set forth in claim 6 above, wherein the means for stretching the isolation diaphragms taut comprises circumferential means for deforming a ring of material about the interior volume of the reference plate to radially prestress the isolation diaphragm material therebetween.

8. A differential pressure transducer having a deflectable diaphragm subject to input fluid pressures on each of two opposite broad faces and comprising:
   a pair of reference plates, each adjacent to and spaced apart from a different broad face of the diaphragm and coupled to the diaphragm about the periphery thereof to define a first deflection volume, the reference plates each having a thickness sufficient to be substantially undeflected by operating pressures in the system and a flat reference surface on a side opposite the diaphragm;
   a pair of isolation sheet members each spanning the flat reference surface on a different reference plate and defining therewith a pair of second deflection volumes, the reference plates each including conduit means interconnecting the first and second deflection volumes to define first and second enclosed cavities;
   means pressurizing the different enclosed spaces one each side of the diaphragm, thereby curving each of the isolation sheet members outwardly relative to its adjacent reference plate;
   means coupled to apply a different input fluid pressure to each of the sheet members against the means pressurizing the spaces; and
   means for sensing the net deflection of the diaphragm under the applied pressures.

9. The invention as set forth in claim 8 above, wherein enclosed cavities comprising the first and second deflection volumes and the interconnecting conduits are each of the order of 0.001 in$^3$.

10. The invention as set forth in claim 9 above, wherein the enclosed cavities are each approximately 0.0025 in$^3$ and wherein the compliance of the isolation diaphragms is more than approximately 100 times that of the ceramic diaphragm.

11. The invention as set forth in claim 10 above, wherein the spaces between the diaphragm and each of the reference plates and the separations between the sheet members and the reference plates are of the order of one mil.

12. The invention as set forth in claim 8 above, wherein the means pressurizing the spaces comprise oil, and wherein the sheet members have a compliance at least an order of magnitude greater than the diaphragm.

13. The invention as set forth in claim 12 above, wherein the sheet members are metal isolation diaphragms, wherein the reference plates and the diaphragm are ceramic members, and wherein the isolation diaphragms bottom out against the flat reference surfaces before the diaphragm is fully deflected.

14. The invention as set forth in claim 8 above, including means for radially pretensioning the isolation diaphragms.

15. The invention as set forth in claim 8 above, wherein the means for sensing the net deflection comprises means defining capacitance electrodes on the diaphragm and the facing surface of the reference plate, such facing surface being flat and parallel to the nominal plane of the diaphragm.

16. The invention as set forth in claim 15 above, wherein the capacitance electrodes comprise, on each side of the diaphragm, a center electrode on the diaphragm at a maximum deflection region and an outer electrode in a minimal deflection region, and complementary electrodes on the opposing surfaces of the reference plates, to form sensing capacitors and reference capacitors.

17. The invention as set forth in claim 16 above, wherein the transducer further includes means for coupling the reference capacitors in parallel to provide signal variations representative of effects due to static pressure and ambient temperature variations.

18. A differential pressure transducer comprising:
 a deflectable sensing diaphragm and a pair of substantially undeflectable reference plates on opposite sides of the diaphragm, the reference plates having flat reference surfaces on the opposite sides from the diaphragm;
 a pair of isolation diaphragm means, each spanning a different one of the reference surfaces, and including means for mechanically radially pretensioning the isolation diaphragms;
 means including pressurizing fluid communicating between the different ones of the isolation diaphragms and the respectively associated sides of the sensing diaphragms, for transferring input pressures applied to the different isolation diaphragms to the opposite sides of the sensing diaphragm, wherein the pressurizing fluid forces the isolation diaphragms into outward curvatures relative to the adjacent reference plate; and
 means for detecting the net deflection of the sensing diaphragm.

19. The invention as set forth in claim 18 above, wherein the isolation diaphragms have compliances at least an order of magnitude greater than the sensing diaphragm and deflect within a linear range in response to applied pressure.

20. The invention as set forth in claim 19 above, wherein the means for mechanically radially pretensioning the isolation diaphragms each comprises an outer peripheral surface in the plane of the flat reference surface of the reference plate, a raised circular bead inside the outer peripheral surface, and annular means for clamping the periphery of the isolation diaphragm down onto the peripheral surface about the circular bead.

21. The invention as set forth in claim 19 above, wherein the means for mechanically radially pretensioning the isolation diaphragms each comprise a first ring having an outer peripheral surface adjacent the plane of the flat reference surface of the reference plate, the ring including a groove therein about the reference plate, and a second ring engaging the diaphragm against the first ring, the second ring including a protrusion matingly engaging the groove in the first ring.

22. A differential pressure transducer comprising:
 a sensing diaphragm;
 a pair of reference plates on opposite sides of the sensing diaphragm, the reference plates including substantially flat reference surfaces on the sides away from the sensing diaphragm;
 a pair of initially flat surfaces isolation diaphragms, each adjacent and parallel to a different reference surface, the isolation diaphragm, reference plates and sensing diaphragms defining a pair of enclosed cavities of less than 0.010 in$^3$ in volume;
 means filling the enclosed cavities with pressure communicating fluid to deflect the isolation diaphragms outwardly from the reference surfaces; and
 means coupled to the sensing diaphragm for sensing the net deflection thereof.

23. The invention as set forth in claim 22 above, wherein each of a pair of applied input pressure sources are coupled to act against the different isolation diaphragms, and wherein the reference surfaces serve as bottoming out surfaces for the isolation diaphragms.

24. The invention as set forth in claim 23 above, wherein the isolation diaphragms are substantially more compliant than the sensing diaphragm.

* * * * *

Disclaimer and Dedication 4,670,733—*Robert L. Bell*, Agoura Hills, Calif. DIFFERENTIAL PRESSURE TRANSDUCER. Patent dated June 2, 1987. Disclaimer and Dedication filed Sept. 6, 1991, by the assignee, Bell Microsensors, Inc.

Hereby disclaims and dedicate to the Public the remaining term of said patent.
*[Official Gazette December 17, 1991]*